United States Patent [19]
McCord et al.

[11] Patent Number: 4,755,261
[45] Date of Patent: Jul. 5, 1988

[54] VAPOR GENERATING AND RECOVERY METHOD FOR VAPOR RETENTION AND REUSE

[76] Inventors: James W. McCord, 9101 Nottingham Pkwy., Louisville, Ky. 40222; Lamont I. Hoppestad, 10802 Bell Rock Ct., Louisville, Ky. 40243; Michael J. Ruckriegel, 410 Westwood Dr., Middletown, Ky. 40243

[21] Appl. No.: 38

[22] Filed: Jan. 2, 1987

Related U.S. Application Data

[63] Continuation of Ser. No. 581,545, Feb. 21, 1984, abandoned.

[51] Int. Cl.[4] .......................... B01D 3/06; B08B 7/00
[52] U.S. Cl. ........................................ 203/4; 203/88; 203/100; 203/DIG. 4; 134/11; 134/12; 134/109; 159/42; 202/170; 202/175; 202/176; 202/234; 228/34; 432/197
[58] Field of Search ............... 203/100, 4, 26, DIG. 4, 203/98, 88, 2; 202/170, 175, 234, 265, 176; 134/10–12, 15, 31, 32, 37, 104–109; 159/42; 432/28, 197, 210; 228/34, 36

[56] References Cited

U.S. PATENT DOCUMENTS

| | | | |
|---|---|---|---|
| 1,421,108 | 6/1922 | Taylor | 159/42 |
| 2,976,224 | 3/1961 | Gilliland | 203/100 |
| 3,032,482 | 5/1962 | Shoemaker | 203/100 |
| 3,181,600 | 5/1965 | Woodward et al. | 203/100 |
| 3,642,583 | 2/1972 | Greenberg et al. | 159/42 |
| 3,904,102 | 9/1975 | Chu et al. | 202/170 |
| 3,947,240 | 3/1976 | Pfahl | 432/210 |
| 4,210,461 | 7/1980 | Mörée et al. | 134/11 |
| 4,394,216 | 7/1983 | McCord | 202/170 |
| 4,488,933 | 12/1984 | Claunch et al. | 202/83 |

Primary Examiner—Wilbur Bascomb
Attorney, Agent, or Firm—Charles G. Lamb

[57] ABSTRACT

An apparatus for vaporizing a liquid and condensing the vapor includes at least one chamber in which the liquid is vaporized and in which the vaporized liquid is condensed. The vaporizing chamber contains a heat emitting device providing a surface temperature above the vapor temperature for substantially instantaneously vaporizing the liquid condensate maintaining a predetermined vapor level in the vaporizing chamber, and a heat absorbing device for condensing the vaporized liquid.

14 Claims, 2 Drawing Sheets

VAPOR GENERATING AND RECOVERY METHOD FOR VAPOR RETENTION AND REUSE

This is a continuation of application Ser. No. 581,545, filed Feb. 21, 1984, now abandoned.

BACKGROUND OF THE INVENTION

1. Field of the Invention

This invention relates to a vapor generating and recovering apparatus for vaporizing a liquid and maintaining the vaporized liquid in a vapor state in a container having an open top, and more particularly, to such an apparatus using a hot surface for substantially vaporizing immediately all of a condensed vapor.

2. Description of the Prior Art

Vapor generating and recovery apparatuses are well known for use in surface treating various objects. The surface treating can be a cleaning treatment wherein foreign material, such as, for example, oil or wax is removed from the surface of the object, or a recovery treatment wherein a contaminated chemical is purified by distillation, or a heat emitting treatment for shrink fitting, or a heat absorbing treatment for reflowing metals. Regardless of the exact nature of the surface treatment, the objects to be surface treated are, typically, immersed into a vapor of an appropriate surface treating material. As the liquid boils, the vapor is recovered for reuse in the treating process.

In some instances, objects to be surface treated are at a sufficiently low temperature relative to the temperature of the vaporized liquid. When these relatively cold objects are immersed in the vapor, the objects initially and rapidly absorb enough heat from the treatment vapor to condense this vapor to a liquid. When this happens, the vapor zone collapses. The time required for revaporizing the liquid is lost to the treatment process thereby extending the time required to complete the treatment operation. This lost time increases costs, particularly when the treatment process is a step in a high volume manufacturing operation.

One example of a heretofore known apparatus is taught in U.S. Pat. No. 3,947,240 issued on Mar. 30, 1976. The apparatus is for generating a vapor for soldering, fusing or brazing articles. The apparatus includes an open topped vessel having a heating coil in the portion end and cooling coils between the top and bottom of the vessel. An eutectic solder heated by the heating coil forms a molten pool over the bottom of the vessel. A liquid to be vaporized forms a pool floating or forming a stratified layer of liquid on top of the molten pool of eutectic solder. The liquid is brought to and maintained at a boil by the heat of the molten solder which acts as a heat transfer medium between the heating coil and the liquid.

SUMMARY OF THE INVENTION

The present invention is directed to a vapor generating and recovery apparatus which provides for the substantially instantaneous vaporization of liquid back to a vapor.

More particularly, the present invention provides a vapor generating and recovery apparatus comprising a housing having at least one chamber, a thermal mass disposed within the at least one chamber; a vaporized liquid; heating means for heating the thermal mass such that the top surface will be at a temperature higher than the vapor temperature of liquid to be vaporized, said heating means being sufficient to vaporize any of said liquid coming in contact therewith; and, cooling means located in the vapor zone for condensing the vaporized liquid.

BRIEF DESCRIPTION OF THE DRAWINGS

A better understanding of the present invention will be had upon reference to the following description in conjunction with the drawings wherein like numerals refer to like parts and in which.

DETAILED DESCRIPTION

Figure 1:
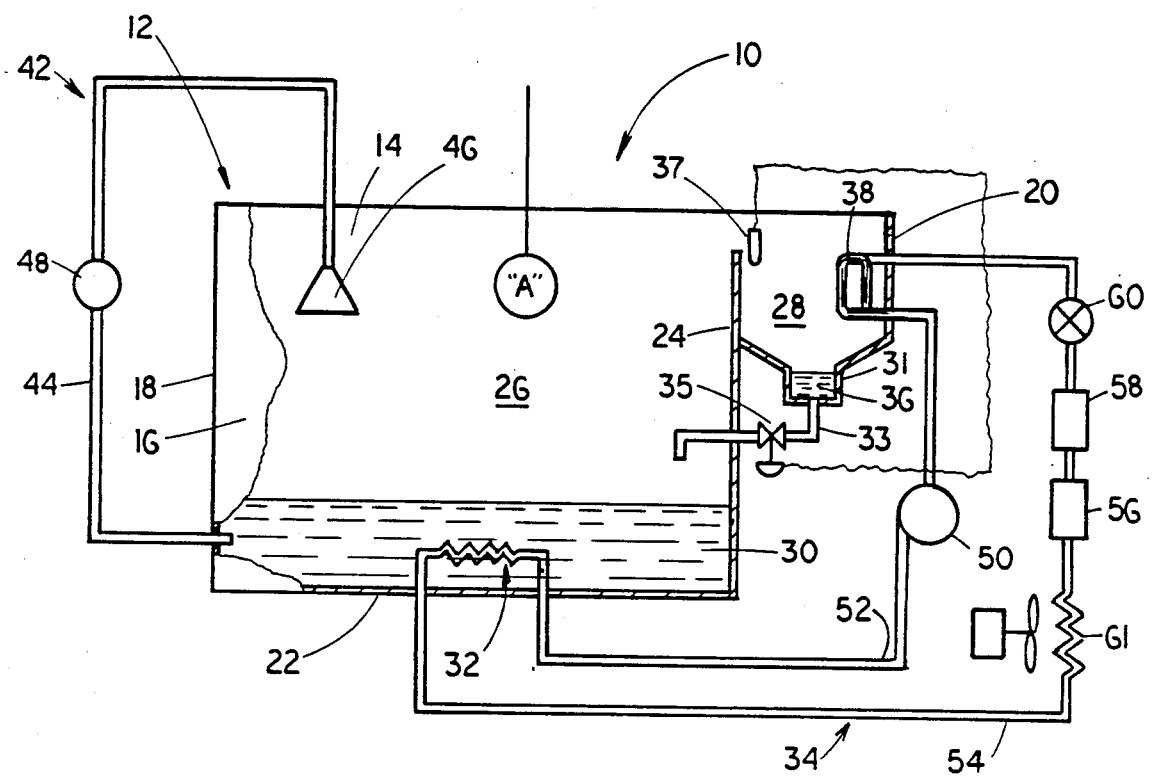
FIG. 1 is a schematic representation, partially broken away, of an advantageous embodiment of a vapor generating and recovery apparatus of the present invention.
Figure 2:
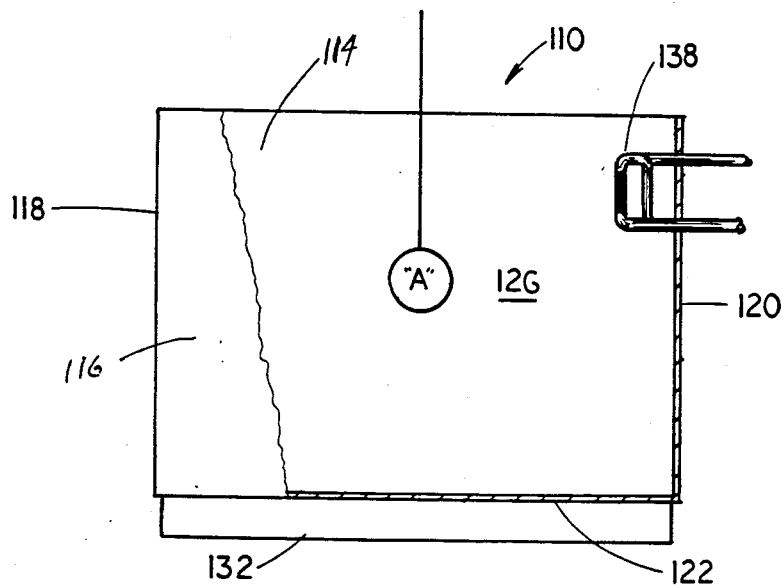
FIG. 2 is a schematic representation, partially broken away, of another advantageous embodiment of a vapor generating and recovery apparatus of the present invention.
Figure 3:
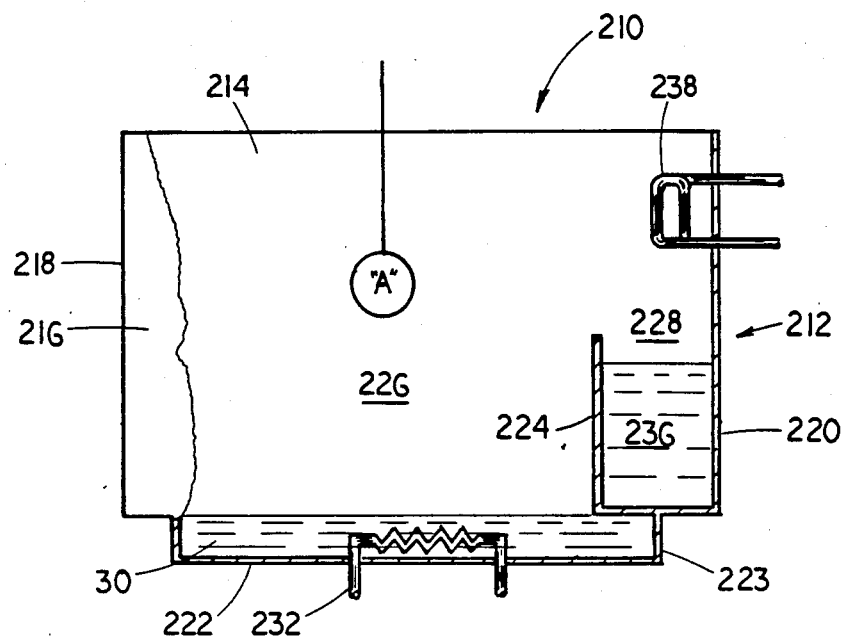
FIG. 3 is a schematic representation, partially broken away, of still a further advantageous embodiment of a vapor generating and recovery apparatus of the present invention; and, FIG. 4 is a view of a vapor generating and recovery apparatus similar to that of FIG. 3 and illustrating an additional feature.

FIGS. 1-3 each illustrate a vapor generating and recovery apparatus, generally denoted as the number 10, 110 and 210 respectively, for vaporizing and recovering a treating liquid. The apparatus can be used, for example, for cleaning objects of oil, grease, wax or particulate matter, or for heat treating an object for shock testing or metal reflow. These examples, however, are given only by way of illustrating some end uses of the apparatus and are not to be considered in any way as limitations of the present invention. For this reason, the apparatus has virtually endless applications, and the composition of the liquid will, of course, depend upon a particular end use.

FIG. 1 illustrates a vapor generating and recovery apparatus 10 including a housing 12 having sapced apart side walls 14 and 16, spaced apart end walls 18 and 20, and a floor 22. A partition wall 24 is located in the interior of the housing between the end walls 18 and 20 spanning the distance between the side walls 14 and 16, thus, dividing the housing interior into a liquid vaporizing chamber 16 and a vapor condensing chamber 28.

A liquid thermal mass 30 is disposed within the liquid vaporizing chamber 26 and forms a pool to a predetermined depth covering the floor 22 of the vaporizing chamber 26. The liquid thermal mass can be, for example, an eutectic metal having an eutectic point, i.e. its lowest melting temperature, lower than the vaporizing temperature of the liquid to be vaporized. Other liquid thermal masses, for example, includes silicone oils, vegetable oil, mineral oil and the like.

The apparatus 10 further includes heating means, generally denoted as the number 32, located in the vaporizing chamber 26 below the top surface of the thermal mass 30 for heating the thermal mass 30 to at least a temperature above the vapor temperature of the liquid. The heating means 32, as illustrated, comprises at least one heat emitting coil, such as, for example, a condensing coil of a refrigerant system, generally denoted as the number 34.

As shown in FIG. 1, the condensing chamber 28 is formed with a condensate reservoir 31 formed in its floor. The condensate reservoir 31 is in liquid flow communication with the condensing chamber 28 by means of, for example, a condensate conduit 33 which transports condensate 36 from the condensate reservoir 31 to the vaporizing chamber 26 above the top surface of the thermal mass 30. The flow of condensate 36 can be controlled by means of a valve 35 located in the condensate conduit 33. The valve 35 can be activated in response to a pressure or temperature sensor 37 located in the vapor above the reservoir 31 in the condensing chamber 28.

The apparatus 10 is also illustrated as including means, generally denoted as the numeral 42, for recirculating a quantity of the thermal mass 30 in the vaporizing chamber 26 and applying the recirculated mass into the vapor above the top surface of the thermal mass 30. As shown, the thermal mass recirculating means 42 includes a conduit 44 having an inlet end in the vaporizing chamber 26 below the top surface of the thermal mass 30, and an outlet end located above the operating level of the zone of vapor in the chamber 26. A dispersion means such as, for example, a spray head 46, is attached to the outlet end of the conduit 44 to break up the recirculated thermal mass exiting the conduit to disperse and direct the recirculated thermal mass generally down over and through the vapor zone. A pump 48 such as, for example, a magnetic pump which uses a magnetic flux to move the thermal mass 30, is located in the conduit 44 for pumping the thermal mass through the conduit 44 and out of the dispersion spray head 46. Thus, the vapor is heated from beneath by the thermal mass 30 and from above by recirculated thermal mass passing downwardly through the vapor from the dispersion spray head 46.

The apparatus 10 also has a vapor condensing means, generally denoted as the number 38, located in the vapor condensing chamber 28 for cooling the vapor to a temperature below the vaporizing temperature causing it to condense in the condensing chamber. The condensing means 38 is shown as being located below the top edge of the weir 24 in the vapor zone of the vaporized liquid. The condensing means is shown as comprising at least one heat absorbing coil. As illustrated, the heat absorbing coil is a refrigerant evaporating coil of the refrigerant system 34.

By way of example, the refrigerant system 34 is shown as including a refrigerant compressor 50 for compressing a suitable refrigerant. The high pressure side of the refrigerant compressor 50 is in refrigerant flow communication with the refrigerant condensing coil 32 through a refrigerant gas conduit 52. The refrigerant evaporator coil 38 is located downstream of the refrigerant consensing coil 32 and is in refrigerant flow communication with the refrigerant condensing coil 32 through a conduit 54. A conventional refrigerant receiver 56, dryer 58 and appropriate thermal expansion valve 60 are also operatively disposed in the conduit 54 between the refrigerant condensing coil 32 and the refrigerant vaporating coil 38. A supplementary refrigerant condensing coil 61 can also be located in the conduit 54 between the refrigerant condensing coil 32 and refrigerant condensing coil 32 and refrigerant evaporator coil 38 to remove excess heat from the refrigerant if required.

The heating means 32 heats the thermal mass 30 in the vaporizing chamber 26 to a temperature above the vaporizing temperature of the treating liquid. The thermal mass 30, in turn, transfers heat to the treating liquid being transferred from the condensing chamber 28 to the vaporizing chamber 26 causing the treating liquid to vaporize. The relatively large surface area and high temperature of the thermal mass 30 results in rapid heat transfer from the thermal mass 30 to the treating liquid. Thus, as the treating liquid vapor may be cooled below its vaporizing temperature when objects "A" to be treated are initially immersed in the treating vapor, the treating liquid condensate will be substantially immediately reheated to its vaporizing temperature with a minimum amount of time lost to the surface treating process.

As the vapor rises from the vaporizing chamber 26, it migrates toward the vapor zone over the condensing chamber 28 whereat it is condensed by the cooling means 38 to a temperature below the vaporizing temperature of the treating liquid and is collected in the condensing chamber 28.

FIG. 2 illustrates another advantageous embodiment of a vapor generating and recovery apparatus, generally denoted as the number 110, which has a number of features in common with the apparatus 10 of FIG. 1.

The apparatus 110 includes a housing 112 having side walls 114 and 116, end walls 118 and 120, and a floor 122 cooperating to define a vaporizing and condensing chamber 126. Heating means 132 such as, for example, an electrical resistance heater, is located beneath and in contact with the housing floor 122. The heat energy generated by the heating means 132 is transferred to the housing floor 122 and is sufficient to heat the housing floor 122 to a temperature above the vaporizing temperature of the vaporized liquid in the chamber 126. Therefore, the housing floor functions as a thermal mass.

The apparatus 110 also includes vapor condensing means such as cooling means 138 in the chamber 126 at a predetermined location above the housing floor 122 for condensing the vapor back toward the housing floor 122. The cooling means 138 can be virtually any type, for example, a cold water circulation coil or a refrigerant evaporator coil of a refrigerant system. The cooling means cools the vapor to a temperature below the vaporizing temperature causing the vapor to condense and fall back to the housing floor 122.

In operation, the heated housing floor 122 functions as a thermal mass which substantially instantaneously vaporizes any liquid which comes into contact with it. Therefore, as the condensate contacts the housing floor 122 the condensate is substantially instantaneously vaporized. The cooling means 138 condenses the rising vapors for revaporization upon contact with the thermal mass of the housing floor 122 and prevents vapors from escaping from the chamber 126. The result is that a zone of vapor is continuously maintained from the top surface of the thermal mass housing floor 122 toward the cooling means 138.

FIG. 3 illustrates a further advantageous embodiment of a vapor generating and recovery apparatus 210 including a housing 212 having spaced apart side walls 214 and 216, spaced apart end walls 218 and 220, and a floor 222. A partition wall 224 is located in the interior of the housing 212 between the end walls 218 and 220 spanning the distance between the side wall 214 and 216. The partition wall 224 cooperates with the end wall 218 to define a liquid vaporizing chamber 226 therebetween and cooperates with the end wall 220 to define a vapor condensing chamber 228 therebetween. It should be noted that the partition wall 224 extends above the housing floor 222 to a predetermined height. The bottom edge of the partition wall 224 is spaced a predetermined distance above the housing floor 222, that is, the partition wall 224 does not extend to the housing floor 222. As shown, the housing floor 222 is recessed to form a reservoir 223. The reservoir 223 occupies most of the floor area in the vaporizing chamber 226 and a portion of the floor area in the condensing chamber 228.

A thermal mass 30 is located in the apparatus 210 for maintaining vaporization of the treating liquid. The thermal mass 30 covers the floor area in the vaporizing chamber 226 and at least a portion of the floor area in the condensing chamber 228. As shown, the thermal mass is located in the reservoir 223. The thermal mass 30 is illustrated as being electrically heated by, for example, electric resistance coil 232 located within the thermal mass 30.

The apparatus 210 also has a vapor cooling means, generally denoted as the numeral 238, shown as being located over the vapor condensing chamber 228 above the top edge of the partition wall 224 in the zone of vapor for cooling the liquid vapor to a temperature below the vaporizing temperature and causing the vapor to condense and fall into the condensing chamber 228. The cooling means comprises at least one heat absorbing coil. The heat absorbing coil can be of virtually any type, but is shown for the sake of illustration as a water cooled coil through which relatively cool water flows.

In the illustrated vapor generating and recovery apparatus 210, the partition wall 224 not only separates the vaporizing chamber 226 from the condensing chamber 228, but further functions as a weir for controlling the return of condensate from the condensing chamber 228 to the vaporizing chamber 226. The partition wall 224 is of a predetermined height such that when the level of condensate 236 in the condensing chamber 228 reaches the top edge of the partition wall 224, the condensate 236 will flow over the top edge of the partition wall into vaporizing chamber 226.

The heating means 232 heats the thermal mass 30 in the vaporizing chamber 226 to a temperature above the vaporizing temperature of the treating liquid. Thus, as the treating liquid vapor may be cooled below its vaporizing temperature when objects "A" to be treated are initially immersed in the treating vapor, the treating liquid condensate will be substantially immediately reheated to its vaporizing temperature upon contact with the top surface of the thermal mass 30.

Figure 4:
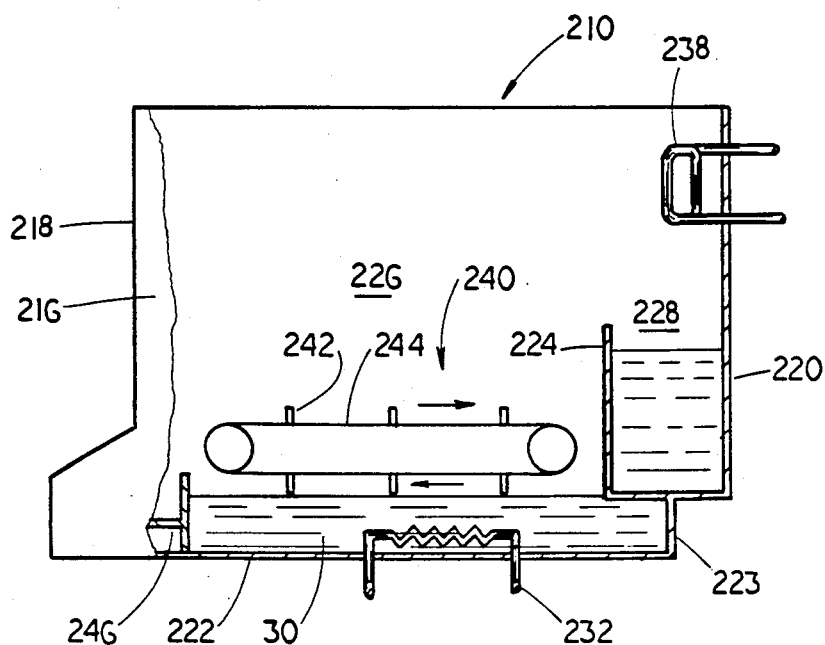

FIG. 4 illustrates a vapor generating and recovery apparatus 210 substantially identical to the appearance 210 of FIG. 3 and includes the additional feature of a contaminate removal means. Contaminants from the items "A" being treated in the apparatus 210 may collect on the top surface of the thermal mass 30, and if allowed to build-up, act as an insulation reducing the heat transfer rate from the thermal mass 30 to the condensate falling back to the top surface of the thermal mass. Therefore, the apparatus 210 shown in FIG. 4 embodies a contaminate removal means exemplified as skimming means, generally denoted as the numeral 240, for maintaining the top heat transfer surface of the thermal mass 30 clean and, therefore, providing for the direct heating of the vapor in the vaporizing chamber 226 as well as the substantially immediate vaporizing of any condensate falling on the top surface of the thermal mass 30. As illustrated, the skimming means 240 comprises a plurality of doctor blades 242 attached to a continuous conveyor device 244. The conveyor device 244 is located over the top surface of the thermal mass 30 in the vaporizing chamber 226 such that the tip of the doctor blades 242 on the bottom flight just penetrates the top surface of the thermal mass 30. Thus, as the bottom conveyor flight moves, it causes the doctor blades 242 to skim the contaminants from the top surface of the thermal mass 30. The doctor blades 242 move the contaminants along the top surface of the thermal mass 30 toward and into a contaminant storage bin 246 in the housing wall 218 for disposal.

The foregoing detailed description is given primarily for clearness of understanding of the present invention and no unnecessary limitations are to be understood therefrom for modifications will become obvious to those skilled in the art upon reading this disclosure and may be made without departing from the spirit of the invention or scope of the appended claims.

What is claimed is:

1. A method of vaporizing a liquid and condensing the vapor in a vapor generating and recovery apparatus used to surface treat an object having a vaporizing chamber and a condensing chamber separated from the vaporizing chamber and in both liquid and vapor flow communication with the vaporizing chamber, comprising the steps of:
    heating a thermal mass at the bottom of the vaporizing chamber only to a temperature sufficiently higher than the vaporizing temperature of the liquid to be vaporized to substantially immediately vaporize any of the liquid coming in contact therewith;
    contacting the thermal mass with the liquid thereby substantially immediately vaporizing the liquid;
    surface treating an object immersed in the vaporized liquid in the vaporizing chamber while allowing the vaporized liquid to flow from the vaporizing chamber into the condensing chamber;
    condensing the vaporized liquid in the condensing chamber;
    returning the condensed liquid from the condensing chamber directly to the vaporizing chamber; and,
    contacting the thermal mass with the condensed liquid thereby substantially immediately vaporizing the liquid.

2. The method of claim 1, wherein the thermal mass is a pool of liquid.

3. The method of claim 2, wherein the liquid is an eutectic metal.

4. The method of claim 2, wherein the liquid is an oil.

5. The method of claim 2, further comprising the steps of:
    removing a portion of the liquid thermal mass from the pool of liquid thermal mass; and,
    passing the removed portion of the liquid thermal mass downwardly through the vaporized liquid rising from the pool of thermal mass liquid and back into the pool of thermal mass liquid.

6. The method of claim 1, wherein the thermal mass is solid.

7. The method of claim 1, further comprising the step of skimming the top surface of the thermal mass to remove contaminants therefrom.

8. A method for vaporizing a liquid and condensing the vapor in a vapor generating and recovery apparatus used to surface treat an object having a vaporizing chamber and a condensing chamber separated from the vaporizing chamber and in both liquid and vapor flow communication with the vaporizing chamber, comprising the steps of:

heating a thermal mass at the bottom of the vaporizing chamber only to a temperature sufficiently higher than the vaporizing temperature of the liquid to be vaporized to substantially immediately vaporize any liquid coming in contact with the top surface of the thermal mass;

contacting the top surface of the thermal mass with the liquid whereupon the liquid is substantially immediately vaporized;

surface treating an object immersed in the vaporized liquid in the vaporizing chamber while allowing the vaporized liquid to flow from the vaporizing chamber into the condensing chamber;

condensing the vaporized liquid in the condensing chamber;

returning the condensing liquid from the condensing chamber directly to the vaporizing chamber; and, contacting the top surface of the thermal mass with the returned liquid whereupon the condensed liquid is substantially immediately vaporized.

9. The method of claim 8, further comprising the step of skimming the top surface of the thermal mass to remove contaminants therefrom.

10. The method of claim 8, wherein the thermal mass is a pool of liquid.

11. The method of claim 10, wherein the liquid is an eutectic metal.

12. The method of claim 10, wherein the liquid is an oil.

13. The method of claim 8, wherein the thermal mass is solid.

14. The method of claim 10, further comprising the steps of:

removing a portion of the liquid thermal mass from the pool of liquid thermal mass; and, passing the removed portion of the liquid thermal mass downwardly through the vaporized liquid rising from the pool of thermal mass liquid and back into the pool of thermal mass liquid.

* * * * *